Sept. 22, 1953     F. SUDIA, JR     2,652,609
METHOD OF MAKING MOLDS
Filed Jan. 17, 1950
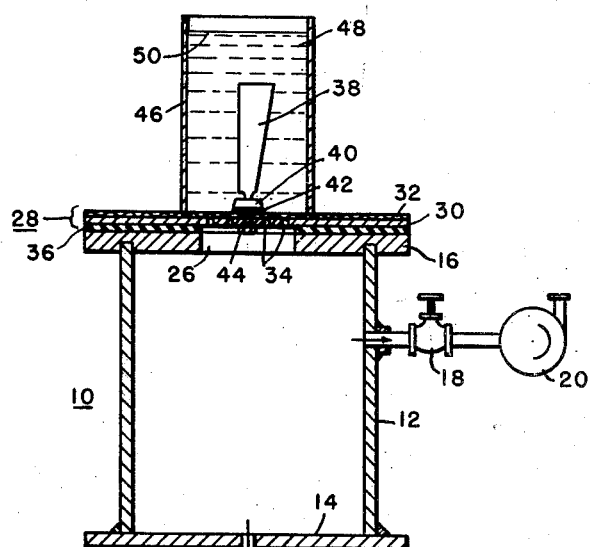
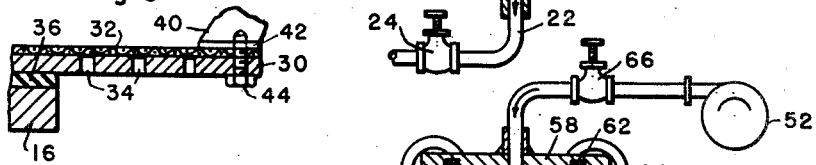
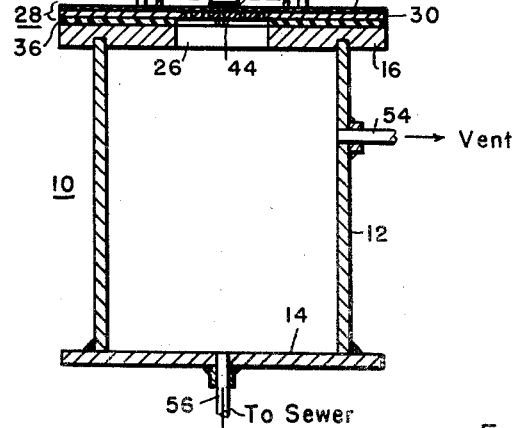
WITNESSES:
INVENTOR
Frank Sudia, Jr.
BY
James K. Ely
ATTORNEY Patented Sept. 22, 1953

2,652,609

UNITED STATES PATENT OFFICE 2,652,609

METHOD OF MAKING MOLDS

Frank Sudia, Jr., Turtle Creek, Pa., assignor to Westinghouse Electric Corporation, East Pittsburgh, Pa., a corporation of Pennsylvania Application January 17, 1950, Serial No. 139,094

3 Claims. (Cl. 22—196)

This invention relates to precision casting and in particular to the method of making molds for use in precision casting.

Heretofore in the making of molds for precision casting, a slurry of refractory material and a binder has been invested about a wax pattern disposed in a suitable flask. The flask containing the pattern and investment material was thereafter subjected to a vibration treatment to effect a packing of refractory material about the wax pattern after which the binder was permitted to set or gel to effect the solidification of the investment.

In forming the molds where refractory material is packed by vibration, it is found that there is a segregation of the fine particles of the refractory material in the upper end of the flask with the result that it is necessary to cut off the upper end of the flask and the mold material therein and to discard such cut-off portion containing the fine segregation. It was thus impossible to obtain a uniform distribution of the refractory material or to control the particle size distribution with the result that poor castings were obtained.

An object of this invention is to provide a method of making molds of refractory materials and a binder therefor in which a substantially uniform distribution of the refractory material is obtained.

Another object of this invention is to provide a method of making molds of refractory materials and a binder therefor in which an excess of the binder is removed and the refractory materials are so packed as to have a substantially uniform distribution in the resulting mold.

A further object of this invention is to utilize a differential of pressure in making molds from refractory materials and a binder therefor to effect removal of a part of the binder and pack the refractory materials in a substantially uniform distribution to form the mold body.

Other objects of this invention will become apparent from the following description when taken in conjunction with the accompanying drawing, in which:

Fig. 1 is a view in section of apparatus employed in practicing the teachings of this invention.

Fig. 2 is a view in section of apparatus employed in practicing an embodiment of this invention, and Fig. 3 is a fragmentary view in section, and greatly enlarged, of a part of the apparatus of Figs. 1 and 2.

Referring to the drawing, this invention is illustrated by reference to apparatus utilized in practicing the method to be described. Thus, in Fig. 1 there is illustrated a vacuum chamber 10 formed of the side walls 12, a base plate member 14 and a cover member 16, the side wall members 12 being connected through a valve 18 to a suitable vacuum pump 20. The base plate member 14 is provided with a suitable drain pipe 22 disposed to be connected through a valve 24 to a sump (not shown), or some other suitable disposal unit. As illustrated, the cover 16 is provided with a central opening 26, the purpose of which will be explained more fully hereinafter.

As illustrated, a filter 28 is disposed to seat on the cover 16, the filter being formed of a perforated filter plate 30 and a layer 32 of suitable cloth such as nylon, linen or muslin. In practice, the filter plate 30 is provided with a plurality of perforations 34 disposed in a central area thereof corresponding to the opening 26 in the cover 16. The perforations 34 are preferably formed of $\frac{1}{8}$ inch diameter holes on $\frac{1}{4}$ inch centers. The layer 32 of filter cloth may be of any suitable material, although muslin of the type known to the trade as sixty-square, that is, 60 threads per square inch, has been found to be an exceptionally good filter medium. As illustrated, a rubber gasket 36 is disposed between the filter plate 30 and the cover 16 in order to obtain a good seal therebetween.

In practice, a wax pattern 38 is formed to the shape and size of the article which is to be later cast in metal. The wax of the pattern 38 may be of any suitable formulation, reference being had to the wax disclosed and claimed in Patent 2,467,796 which issued April 19, 1949, to H. B. Willis as being an exceptionally good wax for this purpose. After the wax pattern 38 is formed, preferably with the base member 40 as a part thereof, it is mounted on a thin metal plate 42, better illustrated in the enlarged view of Fig. 3, which is in the form of a disc having a diameter substantially that of the diameter of the base 40. In mounting the pattern 38 on the disc 42, the bottom of the base 40 is heated sufficiently to soften the wax so that it will adhere to the one surface of the metal disc 42.

With the pattern 38 mounted on the metal disc 42 in this manner, the wax pattern 38 is dip-coated in a thin slurry of refractory material and a silicate binder to form a very thin coating (not shown) thereon which will have a smooth surface adjacent to the wax pattern and to make certain that the surface of the wax is thoroughly covered by the refractory material and that all air is excluded therefrom. A suitable dip-coating is that disclosed in Patent 2,441,694, issued May 18, 1948, to Feagin et al. After the pattern 38 is thus immersed in the refractory coating material, the dip coat is permitted to dry and the pattern 38 is then positioned on the filter 28 as by means of a screw 44 which extends through an opening in the filter plate 30 through a corresponding threaded opening in the disc 42 upon which the base 40 is mounted.

With the pattern 38 assembled on the filter 28 in this manner, and the filter 28 positioned on the vacuum chamber 10 as shown and described, an open end flask 46 is disposed about the pattern 38. The flask 46 may be of any suitable metal and is preferably formed of sheet steel having a coating of aluminum or aluminum phosphate on the inner surface thereof as disclosed and claimed in the copending application Serial No. 65,934, filed December 17, 1948, now abandoned, in the name of Gordon et al. With the open ended flask 46 thus encasing the dip-coated wax pattern 38, a slurry 48 of refractory material and a binder therefor is admitted to the flask 46 to completely fill it.

The slurry 48 may be of many different types of material and is generally formed of silica containing an accelerator such as MgO or $NH_4Cl$ and a binder formed of sodium silicate and a hydrolizing acid such as hydrochloric acid or nitric acid. A particularly good formulation of the refractory solids is one formed of 49.6% of 80-mesh silica, 10% of flint having a particle size finer than 200 mesh, 5.4% of MgO as an accelerator, and 35% of a pre-shrunk 80-mesh refractory material. The slurry may contain a varying amount of a binder although as a general rule about 26% of a hydrolized sodium silicate is employed with 64% of the refractory materials of the type just described.

It will, of course, be understood that the refractory materials will vary depending upon the type of a mold desired and the mold cavity to be formed. Thus, for example, if buckling or separation of the dip-coat from the refractory body is likely to be obtained in the making of a casting in the resulting mold, it would be desired to employ refractory material which is not as fine as that described hereinbefore in making the mold. In such case, the refractory material of the slurry could be formed of 59.6% of 80-mesh silicate omitting the flint of the previous formulation. However, this invention is not to be restricted to the formulations given as it will be understood that many other formulations can be employed.

After the slurry has been admitted to the flask to the level of the top edge of the flask, it is noted that a thin film (not shown) of binder is formed on the upper surface of the slurry, which film constitutes an excess of binder in the slurry. A vacuum is then applied to the chamber 10 as by means of the vacuum pump 20, it being understood that the valve 24 is closed and the valve 18 is opened, in order to remove the excess of binder from the slurry in the flask 46. The differential of pressure created by applying the vacuum to the lower end of the flask causes the binder to filter through the refractory material in the flask 46 and therefore drain into the chamber 10. Under the influence of the differential pressure the refractory particles tend to pack while the excess of the binder is being removed to lower the level of the slurry in the flask to a level indicated by the line 50. As soon as the film of excess binder disappears from the upper surface of the slurry and the level of the slurry is lowered to the indicated level 50, additional slurry is added to the flask to bring the slurry to the top of the flask 46, the vacuum being maintained. In practice it is found that the excess binder of the slurry filling a flask having the dimensions of 7 inches by 7 inches by 9 inches high is removed therefrom in a period of time of about 20 minutes. The time, of course, will vary depending upon the amount of binder employed in the initial slurry, it being desired, however, that the differential pressure be applied for a sufficient length of time to take the excess binder all of the way through the investment and to leave only enough binder in the investment to wet the individual particles of the refractory material.

In a particular example, utilizing the refractory formulation of 80-mesh silica and flint as given hereinbefore, and hydrolized sodium silicate as the binder, it was found that where 9½ pounds of binder were employed in the slurry to fill the flask 46 that the differential pressure applied as indicated removed from 2 to 3½ pounds of the binder depending upon the length of time during which the differential of pressure was applied.

After the excess binder has been removed from the refractory materials in the flask 46, the vacuum is released and the flask is permitted to stand for a sufficient period of time, determined by the amount of the accelerator in the refractory material, to effect a setting or gelling of the binder. This gellation of the binder will vary somewhat depending upon the amount of accelerator therein, it being found that by using .27% MgO as the accelerator that the binder will set or gel in approximately 13 minutes. When thus gelled, the mass in the flask 46 is substantially solid except for the inclusion of a few air bubbles which will not harm the mold as they will not form a part of the surface of the mold cavity. The flask 46 can then be removed from the filter plate after which the mold material is preferably aged for from 12 to 30 hours in order to strengthen the gel and effect some air drying of the mold material.

Instead of the two step filling of the flask 46 with the slurry 48 as described hereinbefore, a one step process may be employed in which case a longer flask 46 is used, being completely filled with the slurry and the vacuum is applied to remove the excess binder from the investment material. In such case, it is then necessary to cut off the extension of the flask 46 at the upper end thereof to the level of the gelled mass so as to give a flat surface for later seating the mold and receiving the metal.

In either case, after the set or gelled mass within the flask 46 has been permitted to age, the flask containing the refractory materials and the wax pattern 38 is heated in the position illustrated as by-passing it between a bank of infra-red lamps where the heating effects a melting of the wax of the pattern 38 and the wax flows from the investment material leaving a cavity therein. The dewaxing process will, of course, effect some drying of the refractory materials of the mold. The flask is then passed through a suitable furnace and is heated at a temperature of between 870° C. and 1000° C. for a period of time of about two hours where the last traces of the wax are burned out of the investment material and the investment material is dried leaving a cavity therein which is, in effect, a duplicate of the original wax pattern 38. The dried refractory material in the flask 46 is then ready to receive molten metal into the cavity formed in the material.

Instead of the vacuum packing method described with reference to the apparatus of Fig. 1, the differential in pressure may be applied by a positive application of pressure to the top of the flask 46 as illustrated in Fig. 2 of the drawing. In Fig. 2, like numerals are employed for indicating identical parts with those of the apparatus of Fig. 1, the main distinction being that instead of the vacuum pump 20 of Fig. 1, a pressure pump 52 is employed to apply predetermined pressure to the slurry at the upper end of the flask 46. In this embodiment the conduits 54 and 56 may be open to the atmosphere, the conduit 54 acting as a vent whereas the conduit 56 functions as a drain.

In the positive pressure method, after the dip-coated wax pattern 38 is mounted on the filter 28 and positioned on the cover 16 of the chamber 10, as described with reference to the embodiment of Fig. 1, the flask is disposed about the pattern 38 and slurry is admitted to the flask. Thereafter, a cover 58 having a groove 60 therein of the configuration of the upper end of the flask 46 is seated on the flask 46. Preferably, a gasket 62 is disposed in the groove 60 of the cover 58 to receive the upper end of the flask 46 and effect a good seal between the flask 46 and the cover 58. The cover 58 is then clamped in the assembled position on the flask 46 as by means of a plurality of C-clamps 64 disposed in spaced relation about the flask 46 and the pressure pump 52 is connected through a valve 66 to an opening 68 in the cover 58. Positive fluid pressure is then applied to the slurry in the upper end of the flask 46 to develop a differential in pressure of between 3 and 10 pounds per square inch between the upper end of the flask and the lower end of the flask 46 to force the excess of the binder through the refractory material of the investment and through the filter 28 into the chamber 10 where it escapes only through the drain 56.

In practice, it is found that a pressure of less than 3 pounds per square inch is insufficient for removing the excess of binder from the mold material, with the result that it is impossible to obtain sufficient compacting of the fine particles of the refractory material about the wax pattern 38 to obtain the necessary strength in the resulting mold. On the other hand, however, pressure in excess of 10 pounds per square inch cannot be employed satisfactorily because most of the patterns 38 employed in the precision casting art have hollow spaces therein in order to reduce the weight and save material thereof, and pressure in excess of 10 pounds will cause the collapse of such patterns.

Whether the differential of pressure is applied by the vacuum process described with reference to Fig. 1 or by the positive pressure method described with reference to Fig. 2, it is found that the excess of binder can be removed in substantially the same time so long as the differential in pressure between the upper end of the flask and the lower end of the flask is between 3 to 10 pounds per square inch. In either case, the excess of binder is removed without effecting a segregation of the fine particles of the refractory material so that a uniform mold structure is obtained. In both cases it is necessary to employ the dip-coated wax patterns as it is found that unless such dip-coating is employed, the mold cavity formed in the resulting mold will have rough spots and irregularities therein due to the entrapment of air on the surface of the wax.

The method of this invention has distinct advantages over the vibration methods practiced heretofore. In the vibration methods it is necessary to control the liquid-solid ratio of the investment material as well as the particle size distribution of the refractory materials thereof in order to get packing of the refractory materials. With the differential pressure method described hereinbefore, either the vacuum method or the positive fluid pressure method, the liquid-solid ratio is only critical to the extent of having the investment slurry fluid enough to flow. Further, the particle size distribution may vary over a considerable range without appreciable effect on packing. In the vibration method, the vibration amplitude is also critical and a constant vigilance must be kept on the operating conditions of the vibrators. However, with the differential pressure method, it is only necessary to maintain a differential pressure sufficient to provide filtering.

The differential pressure method described hereinbefore produces a mold in which there is no apparent segregation of the particles. With such molds it has been found possible to cast large articles having slightly curved areas with a considerable saving in time, handling and material over the practices employed prior to this invention. An additional advantage over the prior methods is that it is not necessary to seal the base of the flask to the filter plate as the differential in pressure applied to the slurry in the flask is sufficient for effecting an adequate seal between the bottom edge of the flask and the plate on which it is mounted.

While this invention has been described with reference to particular embodiments thereof, it will, of course, be understood that a number of modifications thereof are possible within the scope of the invention. Since the apparatus employed in practicing the method is of standard components, it will be apparent that the method can be readily reproduced by those skilled in the trade.

I claim as my invention:

1. In the method of making molds, the steps comprising, positioning a wax pattern having a thin coating of refractory material thereover on a filter plate, disposing an open ended flask vertically about the coated pattern on the filter plate, investing the coated pattern by introducing a slurry of refractory material and a hydrolized sodium silicate binder therefor into the flask to cover the coated pattern, applying a differential pressure between the ends of the flask to develop a pressure at the upper end thereof that is between 3 and 10 pounds per square inch higher than the pressure at the lower end of the flask to develop a pressure at the upper end thereof that is higher than the pressure at the lower end of the flask to effect the filtering of the excess of the binder therefrom through the filter plate and pack the refractory material about the coated pattern, effecting a gellation of the remaining binder within the flask, removing the wax of the pattern from the solidified refractory material, and heating the solidified refractory material to harden the mass whereby a substantially solid mold is formed having a cavity therein of the shape and size of the wax pattern.

2. In the method of making molds, the steps comprising, positioning a wax pattern having a thin coating of investment material thereover on a filter plate, disposing an open ended flask vertically about the coated pattern on the filter plate, introducing a slurry of investment material comprising finely divided refractory solids and a binder therefor into the flask to a level to cover the coated pattern, applying a differential of pressure to the ends of the flask to develop a pressure at the upper end thereof that is 3 to 10 pounds per square inch higher than the pressure at the lower end of the flask to cause excess of the binder to flow through the finely divided refractory solids in the direction of the pattern and to pass to the lower end of the flask and thereby to effect packing of the residual portion of the investment into a homogeneous mass about the coated pattern, effecting gellation of the remaining binder within the flask, and thereafter removing the wax pattern and heating the investment to form a substantially solid mold having a cavity of the shape and size of the pattern.

3. In the method of making molds, the steps comprising, positioning a wax pattern having a thin coating of refractory material thereover on a filter plate, disposing an open ended flask vertically about the coated pattern on the filter plate, investing the coated pattern by introducing a refractory slurry comprising finely divided silica particles and a binder therefor into the flask to cover the coated pattern, applying a vacuum to the filter plate to decrease the pressure at the lower end of the flask by a value of from 3 to 10 pounds per square inch below the pressure at the upper end of the flask to thereby effect the removal of the excess of binder from the investment in the flask so that the flow of the binder through the slurry compacts the silica particles about the wax pattern and effects a substantially uniform distribution and packing of the silica particles about the coated pattern, effecting a gellation of the remaining binder of the refractory slurry in the flask, and thereafter removing the wax pattern and heating the bonded silica to form a substantially solid mold having a cavity of the shape and size of the pattern.

FRANK SUDIA, Jr.

References Cited in the file of this patent

UNITED STATES PATENTS

| Number | Name | Date |
|---|---|---|
| 1,742,721 | Noch | Jan. 7, 1930 |
| 1,921,350 | Custer | Aug. 8, 1933 |
| 2,129,697 | Louisot | Sept. 13, 1938 |
| 2,434,780 | Wiss et al. | Jan. 20, 1948 |
| 2,482,257 | Frei, Jr. | Sept. 20, 1949 |
| 2,490,193 | Barr | Dec. 6, 1949 |
| 2,502,789 | James | Apr. 4, 1950 |

FOREIGN PATENTS

| Number | Country | Date |
|---|---|---|
| 6,751 | Great Britain | of 1914 |
| 200,730 | Switzerland | Jan. 2, 1939 |

OTHER REFERENCES

The Iron Age, November 9, 1944, pp. 52–58.